Patented Sept. 12, 1939

2,173,005

UNITED STATES PATENT OFFICE 2,173,005

RESINOUS PRODUCTS FROM ALDEHYDES AND ACRYLIC AMIDES

Daniel E. Strain, Wilmington, Del., assignor to E. I. du Pont de Nemours & Company, Wilmington, Del., a corporation of Delaware No Drawing. Application July 8, 1936, Serial No. 89,657

30 Claims. (Cl. 260—72)

This invention relates to a process for the preparation of synthetic resins and more particularly to a process for the preparation of resins by the interaction of aldehydes with the amides of acids of the acrylic acid series having the general formula

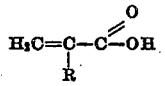

wherein R is hydrogen, a hydrocarbon radical, or substituted hydrocarbon radical.

It is known that the polymerizable esters of unsaturated organic acids, such, for example, as methyl acrylate, methyl methacrylate, and higher esters of these unsaturated organic acids can be polymerized to give resins having highly useful characteristics. Because of their unusual physical and chemical properties a great many important uses have been found for them, but their field of use could be considerably extended by providing a series of resins from substantially the same source which have higher melting points, greater resistance to abrasion, and different solubility characteristics.

An object of the present invention is to provide synthetic resins, by the interaction of the amides of unsaturated organic acids with aldehydes, having many of the above enumerated desirable characteristics. Another object of the invention is to provide a process for the reaction of acrylamide and amides of alpha-substituted acrylic acids with the lower aldehydes, and thereby produce a reaction product which can be subsequently polymerized to a resinous body. A further object of the invention is to provide a process for reacting an amide of the aforementioned type with an aldehyde in the presence of water or a volatile, liquid, organic hydroxy compound in which the hydroxy group is attached to aliphatic carbon atoms. A still further object of the invention is the preparation of clear, water-resistant resins which can be applied or laid down from water solutions and used as stiffening and crease-proofing agents for textiles and as a backing for pile fabrics. Yet another object of the invention is to provide new compositions of matter. Other objects and advantages of the invention will hereinafter appear.

I have found that highly useful resins can be prepared by reacting the monomeric and polymeric amides of polymerizable unsaturated organic acids with the lower aldehydes. This reaction may if desired be conducted in the presence of water or a lower aliphatic alcohol, to produce resins having a great variety of useful physical and chemical characteristics dependent upon the kind of amide and aldehyde reacted as well as upon the presence or absence of water or an alcohol.

Generally the reaction is conducted by heating an amide, such, for example, as methacrylamide with an aqueous formaldehyde containing solution, a suitable catalyst, such for example, as potassium carbonate being present. To prepare a resin having still different properties the monomeric amide, such, for example, as methacrylamide is reacted with formaldehyde in the presence of a monohydric alcohol and a suitable acid catalyst. When conducting the reaction in the presence of an alcohol, it is usually preferable to have in addition to the alkaline material a catalyst of an acidic nature present such as phthalic anhydride.

The product isolated from the interaction of an aldehyde with an amide of a polymerizable organic acid in the presence or absence of water or an alcohol is in the monomeric form and has certain definite solubility characteristics. These characteristics can be readily changed by converting the monomeric product to the polymeric form. This conversion can be accomplished generally by employing well known polymerization processes and catalysts, such, for example, as heat, ultra-violet light, organic peroxides and the like, but I have found that the monomer is susceptible to special treatment which is fully described below.

I shall now illustrate by way of examples several methods of conducting my invention, but it will be distinctly understood that the invention will not be limited to the exact details therein found.

*Example 1.*—18.5 parts of methacrylamide monomer were mixed with 20.25 parts of 37% formaldehyde solution and 1.13 parts of potassium carbonate. The solution was warmed to about 50 or 60° C. and allowed to stand for several hours. At this time 2.8 parts of 80% lactic acid were added and the mixture thoroughly stirred. On standing for four days the reaction mixture set to a clear, colorless, hard, and tough resin which could be sawed, turned, and otherwise worked to shaped articles. When used as a size or as a backing for pile fabrics, it was applied immediately after acidification. The fabric was allowed to stand at room temperature. During the course of several days the resin hardened in place.

*Example II.*—One mol of methacrylamide monomer was warmed with one mol of formaldehyde (40% in water) and 1/27 mol of barium hydroxide. After all the methacrylamide had passed into solution 5% tartaric acid, based on the methylol derivative, was added. The solution containing about 62.5% of the methylol derivative was then filtered and used to impregnate gel rayon. The product was centrifuged and dried at 90° C. and then heated for 20 minutes at 150° C. The product had an angle of crease of 112° compared with 84° for the control which was not impregnated. The angle of crease which is a measure of crease resistance was determined by winding the thread around a double edged blade while supporting a weight of 40 grams. It was creased in this position for 30 minutes, then unwound and cut into sections each of which formed one angle. These angles were measured with a protractor and the values given above represented averages of the measurements of ten such angles.

*Example III.*—An aqueous solution of the polymerized methacrylamide was warmed with an excess of formaldehyde in the presence of hydrochloric acid. On cooling a resinous product precipitated, and was separated by filtration, washed with alcohol, and dried. On molding at 140° C. using 2000 pounds per square inch pressure, hard, rigid, somewhat opaque articles were formed.

*Example IV.*—A transparent, shaped article molded from polymerized methacrylamide was soaked three hours in an acidified formalin solution (37% aqueous formaldehyde). The polymer swelled but did not dissolve in the formaldehyde solution and on drying regained its original shape and appearance. The surface of the article was no longer soluble in water. This treatment may be applied to cast polymer as well as molded polymer.

*Example V.*—Sheets of paper prepared from a well beaten, good grade of bleached sulfite pulp were surface sized with a 2% aqueous solution of the polymerized methacrylamide, partly dried, then treated with a 5% aqueous solution of formaldehyde, and dried by passing them over a heated cylinder. These sheets had considerably better wet strength than untreated sheets, their water resistance was equal to that of rosin-sized sheets, and they were fairly resistant to penetration by mineral oil.

*Example VI.*—A mixture of 15 grams (1/2 mol) of para-formaldehyde, 200 grams of normal butanol, and 1 cc. of 5% sodium hydroxide solution was heated with stirring until a clear solution was obtained. Forty one and one half grams of monomeric methacrylamide, 1/2 gram of phthalic anhydride, and 40 grams of benzene were added and the entire mixture was heated with stirring for 5 hours at such a temperature that the water-organic solvent binary mixture distilled off as fast as it was formed, with subsequent return of the organic solvent to the reaction mixture. During this period 5 cc. of water distilled off and approximately 4 grams of precipitate was formed in the reaction mixture. The product was cooled, filtered, and the solvent removed by distillation in vacuo. The residue was a viscous, water soluble liquid weighing 54 grams. Upon adding 0.5 gram of benzoyl peroxide and heating on a steam bath at about 90° for a few minutes, the viscous liquid polymerized to a hard, opaque solid substance which was insoluble in acetone, butanol, dioxan, toluene, carbon tetrachloride, water, and caustic soda. It was somewhat soluble in cold ethylene glycol and almost completely soluble in boiling ethylene glycol.

It will be appreciated that my invention is not limited specifically to the amides described in the examples, but includes the amides of acids of the acrylic acid series and their polymers or interpolymers with each other or with other polymerizable organic compounds such as acrylic or methacrylic acids, their esters or nitriles, vinyl halides, styrene, methyl vinyl ketone, maleic acid or esters, butadiene, 2-chloro-butadiene-1,3, etc.

The amides of the acrylic acid series to which this invention has reference have the general formula:

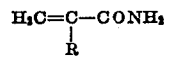
$$H_2C=C-CONH_2$$
$$|$$
$$R$$

in which R designates a hydrogen, alkyl, aryl, or aralkyl group, such as methyl, ethyl, phenyl, or phenylethyl. In lieu of formalin or aqueous formaldehyde solutions para-formaldehyde or trioxymethylene as well as the higher aldehydes, such, for example, as acetaldehyde, propionaldehyde, butyraldehyde, isobutyraldehyde and other higher aldehydes may be employed. If desired part of the aldehyde and/or alcohol may be replaced by an acetal. Thus, for example, if acrylamide is to be reacted with formaldehyde and methanol, the formaldehyde and methanol may be replaced in part by methylal.

Products of widely varying properties may be obtained by interpolymerizing mixtures of monomeric amide-aldehyde condensation products with each other or with other polymerizable organic compounds such as acrylic and methacrylic acids, their esters and nitriles, vinyl compounds, e. g., organic vinyl esters, vinyl halides, styrene, methyl vinyl ketone, maleic acid and its esters, butadiene, 2-chlorobutadiene-1,3, etc.

In the processes as disclosed in Examples 1 to 5 inclusive, it has been found advisable to form the initial reaction products by the use of an alkaline catalyst, such as potassium carbonate, sodium carbonate, potassium hydroxide, sodium hydroxide, or barium hydroxide. In place of these alkali metal catalysts any soluble inorganic base or basic salt, or certain organic basic compounds may be used. The reaction of aldehydes with amides of the type disclosed herein may be carried out in neutral or acidic solution to obtain products of varying properties.

When reacting the amide and aldehyde in the presence of an alcohol, such for example, as the monohydric primary, secondary, and tertiary alcohols in which the alcohols contain preferably less than 5 carbon atoms, such, for example, as methanol, ethanol, normal and isopropanol, normal and isobutanol, the higher aliphatic alcohols, etc., it seems generally advisable that the condensation be effected in an acidic medium, such, for example, as the phthalic anhydride of Example 6. In place of the phthalic anhydride, however, other organic acids or their anhydrides or certain weak inorganic acids and acid salts may be used. Examples of the latter type of catalyst include phosphoric acid and sodium dihydrogen phosphate.

When conducting the reaction in the presence of an aliphatic alcohol the caustic soda is used more to facilitate solution of the para-formaldehyde in the alcohol employed than as a catalyst and the phthalic anhydride or other type catalyst above referred to is used in quantities preferably more than are sufficient to combine with any free caustic present.

The product resulting from the interaction of the amide with the aldehyde in the presence of water can be readily polymerized as indicated in the examples, and it has been generally found that hard, clear, resins may be prepared by conducting the polymerization of these products in the presence of water soluble aliphatic carboxylic acids generally, and more particularly such acids as lactic acid, tartaric acid, acetic acid, etc.

The resin whether obtained via the processes as covered by Examples 1 to 5 or the process of Example 6 may be modified by adding softeners to the solution before polymerization or by adding other known resin forming ingredients, as, for example, dimethylol urea, phenol-formaldehyde, aniline-formaldehyde, or ketone-formaldehyde condensation products and other mono- and polyamides and their methylol derivatives.

The ratio between the amide and aldehyde may be varied over a range considerably beyond that disclosed by the examples but it has been found generally that products having highly useful physical and chemical properties result by effecting the reaction in accord with the proportions used throughout the examples.

These resins have been found particularly useful when formed in situ as backing for pile fabrics, as sizing agents for fabrics, as coatings for wood and paper, and as crease-proofing agents for textiles.

From a consideration of the above specification it will be appreciated that many changes may be made in the details of the process herein disclosed without departing from the scope of the invention.

I claim:

1. A process of reacting amides of acids of the acrylic acid series having the general formula

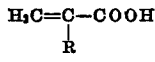

wherein R is a radical of the group consisting of hydrogen and a hydrocarbon radical, with lower molecular weight aliphatic aldehydes and thereby producing a condensation product.

2. A process of reacting monomeric amides of the acrylic acid series having the general formula

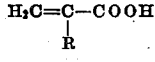

wherein R is a radical of the croup consisting of hydrogen and a hydrocarbon radical, with lower molecular weight aliphatic aldehydes and thereby producing a condensation product.

3. A process of reacting polymeric amides of the acrylic acid series the monomeric forms of which have the general formula

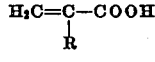

wherein R is a radical of the group consisting of hydrogen and a hydrocarbon radical, with lower molecular weight aliphatic aldehydes and thereby producing a condensation product.

4. A process of reacting amides of acids of the acrylic series having the general formula

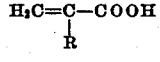

wherein R is a radical of the group consisting of hydrogen and a hydrocarbon radical, with formaldehyde and thereby producing a condensation product.

5. A process of reacting monomeric amides of acids of the acrylic acid series having the general formula

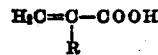

wherein R is a radical of the group consisting of hydrogen and a hydrocarbon radical, with formaldehyde and thereby producing a condensation product.

6. A process of reacting polymeric amides of acids of the acrylic acid series having the general formula

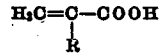

wherein R is a radical of the group consisting of hydrogen and a hydrocarbon radical, with formaldehyde and thereby producing a condensattion product.

7. A process of reacting an alpha-alkyl substituted acrylic acid amide with formaldehyde and thereby producing a condensation product.

8. A process of reacting polymeric alpha-alkyl substituted acrylic acid amide with formaldehyde and thereby producing a condensation product.

9. A process of reacting methacrylamide and formaldehyde and thereby producing a condensation product.

10. A process of reacting polymeric methacrylamide and formaldehyde and thereby producing a condensation product.

11. A process of reacting an amide of acids of the acrylic acid series having the general formula,

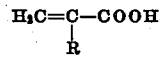

wherein R is a radical of the group consisting of hydrogen and a hydrocarbon radical, with a lower molecular weight aliphatic aldehyde in the presence of a hydroxyl-containing compound and thereby producing a condensation product.

12. A process of reacting an amide of acids of the acrylic acid series having the general formula

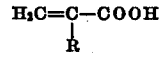

wherein R is a radical of the group consisting of hydrogen and a hydrocarbon radical, with a lower molecular weight aliphatic aldehyde in the presence of a lower aliphatic alcohol and thereby producing a condensation product.

13. A process of reacting the monomeric amides of acids of the acrylic acid series having the general formula

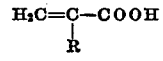

wherein R is a radical of the group consisting of hydrogen and a hydrocarbon radical, with lower molecular weight aliphatic aldehydes and subsequently polymerizing the resulting product.

14. A process of reacting monomeric methacrylamide with formaldehyde and subsequently polymerizing the resulting product in the presence of a water soluble aliphatic carboxylic acid.

15. A process of reacting monomeric methacrylamide with formaldehyde while in the presence of a lower molecular weight aliphatic alcohol, and subsequently polymerizing the resulting product in the presence of benzoyl peroxide.

16. A process of reacting methacrylamide with formalin in the presence of a basic catalyst, and subsequently polymerizing the resulting condensation product while in the presence of lactic acids.

17. A process of reacting para-formaldehyde with monomeric methacrylamide in the presence of normal butanol, sodium hydroxide and phthalic anhydride, and subsequently polymerizing the resulting product in the presence of benzoyl peroxide.

18. A monomeric condensation product of an amide of an acid of the acrylic acid series having the general formula

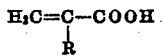

wherein R is a radical of the group consisting of hydrogen and a hydrocarbon radical, and a lower molecular weight aliphatic aldehyde.

19. A polymer of the monomeric composition of claim 18.

20. A monomeric condensation product of an amide of an acid of the acrylic acid series having the general formula

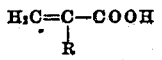

wherein R is a radical of the group consisting of hydrogen and a hydrocarbon radical, and formaldehyde.

21. The polymer of the monomeric composition of claim 20.

22. A monomeric condensation product of methacrylamide and formaldehyde.

23. A polymeric condensation product of methacrylamide and formaldehyde.

24. A monomeric condensation product of methacrylamide, a lower molecular weight aliphatic aldehyde, and a lower molecular weight aliphatic alcohol.

25. The polymer of the monomeric composition of claim 24.

26. A monomeric condensation product of methacrylamide, formaldehyde and normal butanol.

27. A polymer of the monomeric composition of claim 26.

28. The process which comprises condensing polymeric methacrylic amide with formaldehyde.

29. The process which comprises condensing methacrylic amide with formaldehyde.

30. The process which comprises condensing methacrylic amide with formaldehyde and polymerizing the resulting product.

DANIEL E. STRAIN.